United States Patent
Alteneder et al.

(10) Patent No.: US 10,019,345 B2
(45) Date of Patent: Jul. 10, 2018

(54) EXECUTING MULTI-VERSION TESTS AGAINST A MULTI-VERSION APPLICATION

(71) Applicant: HULU, LLC, Santa Monica, CA (US)

(72) Inventors: Theodore Alteneder, Issaquah, WA (US); Federico Nava, III, Issaquah, WA (US)

(73) Assignee: HULU, LLC, Santa Monica, CA (US)

( * ) Notice: Subject to any disclaimer, the term of this patent is extended or adjusted under 35 U.S.C. 154(b) by 230 days.

(21) Appl. No.: 15/155,779

(22) Filed: May 16, 2016

(65) Prior Publication Data

US 2017/0329700 A1 Nov. 16, 2017

(51) Int. Cl.
*G06F 9/44* (2018.01)
*G06F 11/36* (2006.01)

(52) U.S. Cl.
CPC .................. *G06F 11/3672* (2013.01)

(58) Field of Classification Search
CPC ........................................................ G06F 9/44
USPC .................................................. 717/124–127
See application file for complete search history.

(56) References Cited

U.S. PATENT DOCUMENTS

| | | | | |
|---|---|---|---|---|
| 5,359,546 A | * | 10/1994 | Hayes | G06F 11/3688 702/123 |
| 5,966,516 A | * | 10/1999 | De Palma | G06F 17/504 703/1 |
| 6,195,765 B1 | * | 2/2001 | Kislanko | G06F 11/3664 703/22 |

\* cited by examiner

*Primary Examiner* — Jae Jeon
(74) *Attorney, Agent, or Firm* — Fountainhead Law Group P.C.

(57) ABSTRACT

Particular embodiments provide a test system that allows the testing of different versions. The test system uses a repository of features that are included in the multiple versions of the application. When new features are added to the application, they may be added to the repository. When a test is performed, an application blueprint is used to build an application model using features from the repository. Then, a test case for the version can be run using the application model. By maintaining the repository of features and then dynamically building the application model for the version of the application, the testing of different versions of the application can be performed.

18 Claims, 9 Drawing Sheets

EXECUTING MULTI-VERSION TESTS AGAINST A MULTI-VERSION APPLICATION

BACKGROUND

Testing software is essential for a service provider. Often, automated tests are written to evaluate the stability of a software service. In web-delivered software, typically only one version is active at any time. Thus, a single test case can be used against the web-delivered software. In this approach, the test automation assumes that each breaking change to the application coincides with a breaking change to the corresponding automated test. This makes it impossible to run the test against previous versions of the application.

SUMMARY

In one embodiment, a method receives a plurality of application blueprints for a plurality of versions of an application where each application blueprint for each version of the application includes at least one different feature. One of the versions of the application is selected for testing. The method then loads the application blueprint for the first version of the application, the application blueprint defining a first set of features supported by the first version of the application and loads the first set of features and a first set of interfaces for the features, wherein interfaces in the first set of interfaces describe what a corresponding feature does. The application model is built by connecting the first set of interfaces to the first set of features, and then the method connects the application model to the version of the application and a test case for the version of the application. The version of the application is tested by executing a test case against the application model, wherein the first set of interfaces are used to test the first set of features of the version of the application.

In one embodiment, a non-transitory computer-readable storage medium contains instructions, that when executed, control a computer system to be configured for: receiving a plurality of application blueprints for a plurality of versions of an application, wherein each application blueprint for each version of the application includes at least one different feature; selecting one of the versions of the application for testing; loading the application blueprint for the first version of the application, the application blueprint defining a first set of features supported by the first version of the application; loading the first set of features and a first set of interfaces for the features, wherein interfaces in the first set of interfaces describe what a corresponding feature does; building the application model by connecting the first set of interfaces to the first set of features; connecting the application model to the version of the application and a test case for the version of the application; and testing the version of the application by executing a test case against the application model, wherein the first set of interfaces are used to test the first set of features of the version of the application.

In one embodiment, an apparatus includes: one or more computer processors; and a non-transitory computer-readable storage medium comprising instructions, that when executed, control the one or more computer processors to be configured for: receiving a plurality of application blueprints for a plurality of versions of an application, wherein each application blueprint for each version of the application includes at least one different feature; selecting one of the versions of the application for testing; loading the application blueprint for the first version of the application, the application blueprint defining a first set of features supported by the first version of the application; loading the first set of features and a first set of interfaces for the features, wherein interfaces in the first set of interfaces describe what a corresponding feature does; building the application model by connecting the first set of interfaces to the first set of features; connecting the application model to the version of the application and a test case for the version of the application; and testing the version of the application by executing a test case against the application model, wherein the first set of interfaces are used to test the first set of features of the version of the application The following detailed description and accompanying drawings provide a better understanding of the nature and advantages of particular embodiments.

DETAILED DESCRIPTION

Described herein are techniques for a test system to test many different versions of an application. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide a test system that can support the testing of many different versions of an application simultaneously. For example, a service provider maintains multiple versions of a single application. The multiple versions can be deployed to a wide spectrum of devices from a multitude of manufacturers. For example, there may be different platforms, such as mobile, living room, and desktop, and different manufacturers may make devices in each platform. In one embodiment, different releases are not synchronized to every platform and some devices do not auto-update the application to new versions. Accordingly, the service provider may support many different versions of the application simultaneously.

Particular embodiments provide a test system that allows the testing of different versions. The test system uses a repository of features that are included in the multiple versions of the application. When new features are added to the application, they may be added to the repository. When a test is performed, an application blueprint is used to build an application model using features from the repository. Then, a test case for the version can be run using the application model. By maintaining the repository of features and then dynamically building the application model for the version of the application, the testing of different versions of the application can be performed.

Figure 1:
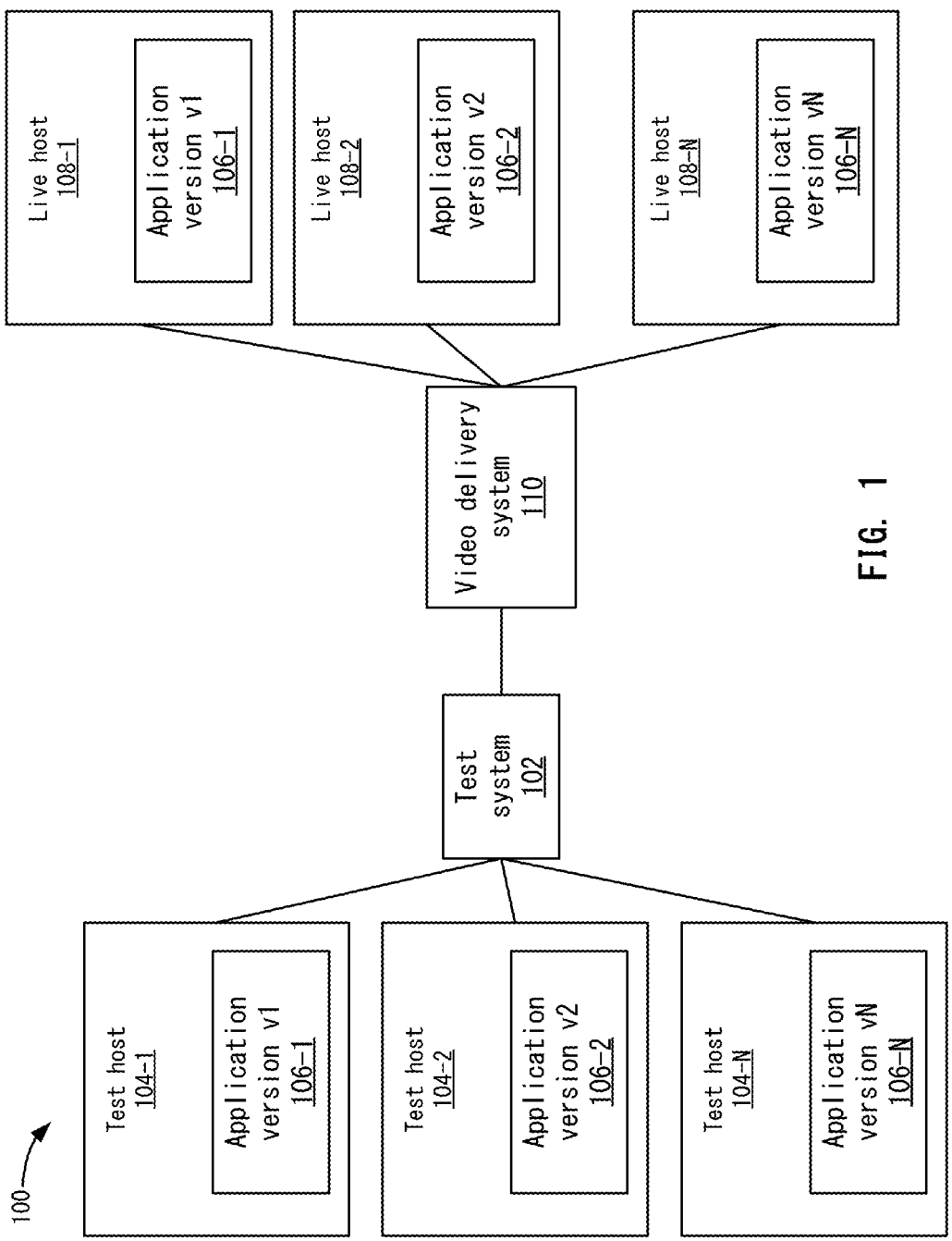
FIG. 1 depicts a simplified system of a testing environment according to one embodiment.

FIG. 1 depicts a simplified system 100 of a testing environment according to one embodiment. A test system 102 may be coupled to one or more test hosts 104-1-104-N. Test hosts 104 may include different versions (v1-vN) of application 106-1-106-N that are being tested. In one embodiment, the different versions are for a single application 106. The different versions of application 106 may be included on a single test host 104 or different versions may be present on different test hosts 104. Also, test hosts 104 may be different physical machines, virtual machines on the same physical machine, or be in other configurations.

Test system 102 may test different versions of the application 106 that may or may not be found on live hosts 108. Live hosts 108 may be any devices that are in actual use for a video delivery service 110. For example, a video delivery service 110 may provide videos to live hosts 108. As described above, live hosts 108 may have different versions of application 106 installed. This may be because the video delivery service does not synchronize releases to every platform and some live hosts 108 do not auto-update applications. Thus, different applications 106 may be installed on live hosts 108. It is noted that the testing may be performed on test hosts 104, which are not in active service. However, the testing can be performed on live hosts 108 while the live hosts are providing the video delivery service to users. Due to the existence of different versions of application 106 being run on live hosts 108, test system 102 may test the different versions of application 106 using test hosts 104. Also, test system 102 may test unreleased versions of application 106.

In one embodiment, application 106 may be a web-delivered software application. A web-delivered software application may include various pages that are displayed on hosts 104. Other examples of application 106 include native mobile applications and desktop PC programs. These examples also may have a user-interface that can be broken down into a directed graph of connected "pages" in an application. The principles of testing these sorts of applications are the same, but the mechanism for communication between the tests and the application vary, as well as how the application presents the pages.

Figure 2:
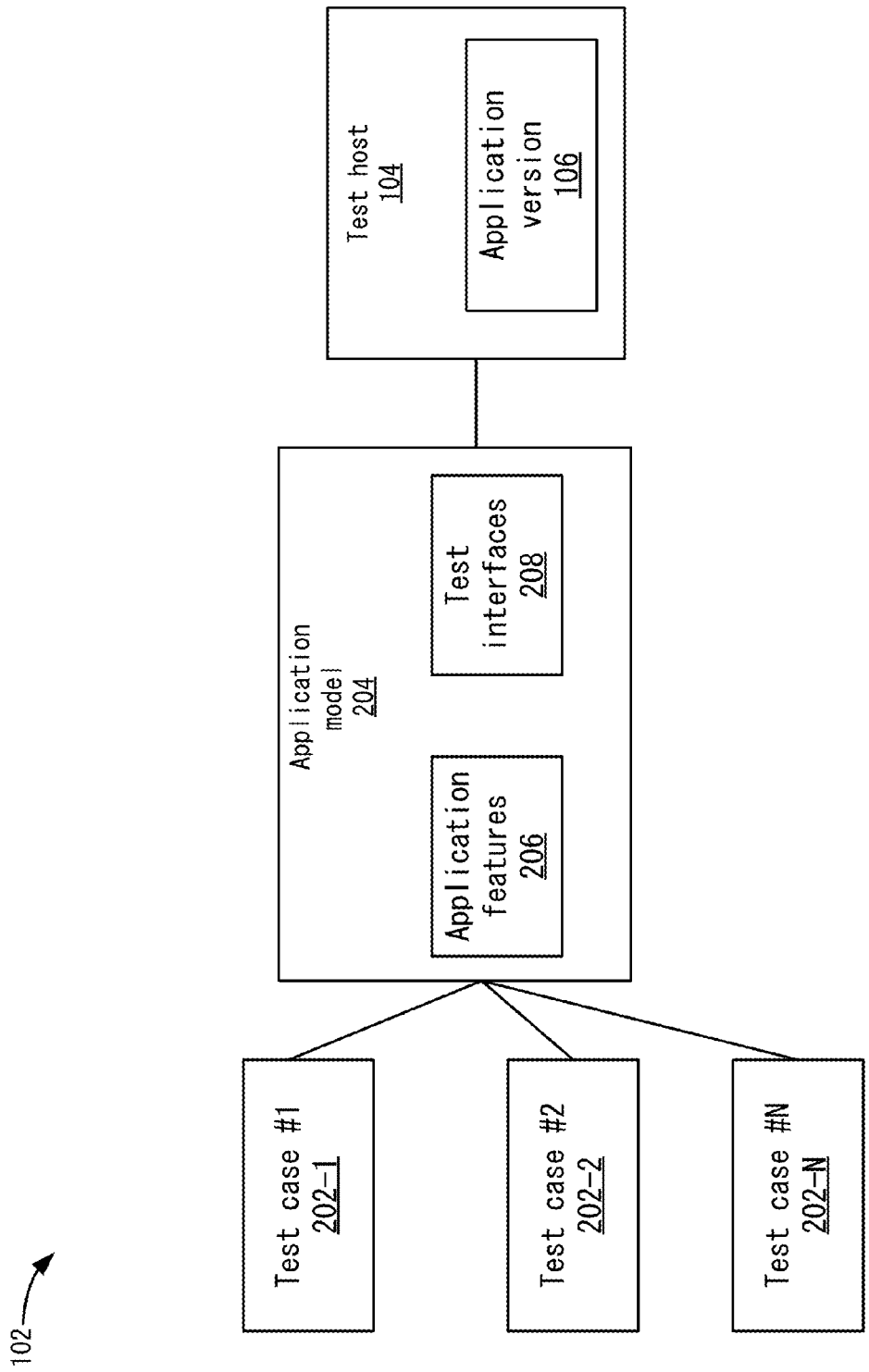
FIG. 2 shows an example of using an application model according to one embodiment.

When a version of application 106 is to be tested, test system 102 may dynamically build an application model. The application model is used to allow the test cases to test different versions of the application. FIG. 2 shows an example of using an application model 204 according to one embodiment. At 202-1-202-N, multiple test cases for different versions of the application are shown. For example, a test case #1 may test an application version #1, a test case #2 may test an application version #2, and a test case #N may test an application version #N.

An application model 204 may be an interface between the test cases and application versions. Application model 204 may represent a model of a single version of the application, and includes application features 206 and test interfaces 208. Application features 206 may be features of the application, such as how the features work in the application. An example of a feature may be a play button on a user interface for the application. A test interface 208 may be what the features do. Each application version may have different application features 206 and different test interfaces 208. For example, each application feature may use a different interface. However, it is possible that different application features 206 may use the same test interface 208.

Particular embodiments separate application features 206 and test interfaces 208. This allows test system 102 to dynamically build an application model with different application features 206 and test interfaces 208 to test a version of application 106. By separating application features 206 and test interfaces 208, changes to application 106 do not result in dependencies that are broken because of the changes, which then would break the test. Also, dependencies between features are loosely defined, and an application blueprint is used to dynamically generate the dependencies. The following illustrates the example of the dependencies.

Figure 3A:
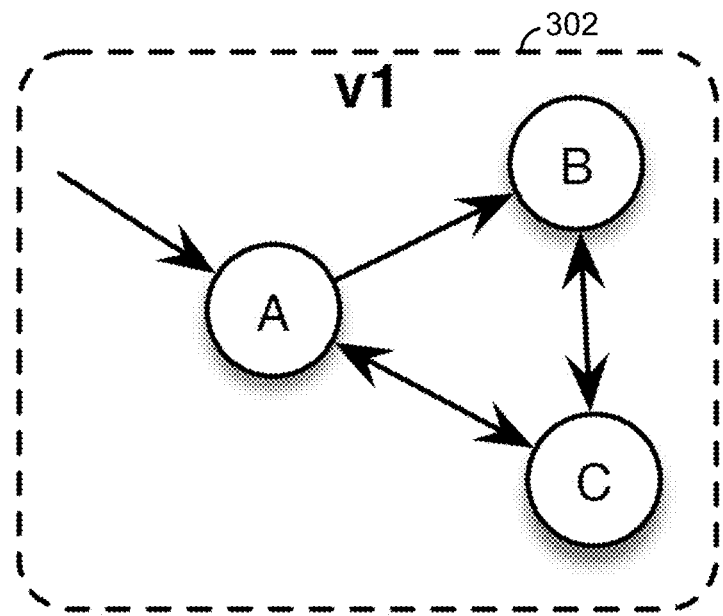
FIG. 3A shows an example of an application version #1 and an application version #2 according to one embodiment.
Figure 3A:
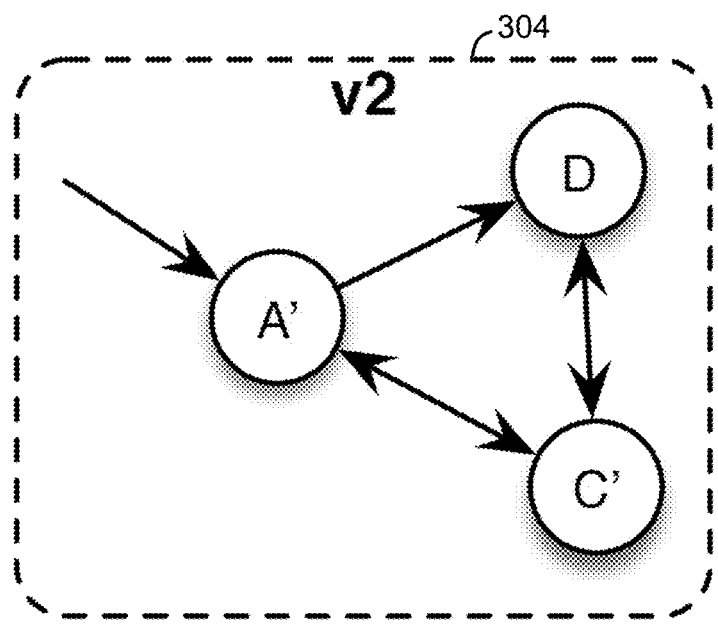

FIG. 3A shows an example of an application version #1 and an application version #2 according to one embodiment. These examples show conceptual applications that include dependencies between features. At 302, an application version #1 (v1) is shown and at 304, an application version #2 (v2) is shown. Features are shown in the circles. For example, application version #1 includes features A, B, and C; and application version #2 includes features A', D and C'. In this case, the arrows between the features indicate dependencies. That is, in application version #1, feature B depends on feature A. Also, features A and C depend on each other and features B and C depend on each other. A dependency for a feature means that whether a function of that feature works or not depends on another feature. For application version #2, feature A has been modified and is denoted by feature A', feature B has been replaced with a different feature D, and feature C is the same but a dependency has changed and is denoted as feature C' due to the change in dependency. In version #2, features A and C remain the same feature, but feature B has been replaced with feature D. Also, in version #2, some details of how feature A works have been modified, which causes a new feature A' to be generated. Also, feature C internally remains the same, but a new feature C' is needed due to its dependency being changed.

Because of these changes, tests written for feature B in application version #1 will no longer work for application version #2 because feature B is no longer present in version #2. Also, tests written for feature A will no longer work because feature A has been changed in version #2 and should be updated. Even though feature C has not changed internally, tests for feature C need to be updated to take into account the new dependency on feature D instead of feature B. Thus, tests written for feature C no longer work and need to be updated. If the test is updated, then tests can only be run against application version #2 and cannot be run against application version #1. To address the issues that result when versions of an application change features and dependencies, test system 102 uses a repository of features where features are disconnected from each other. In this way, features do not depend on other features and are not affected when different versions of application 106 change those features.

Figure 3B:
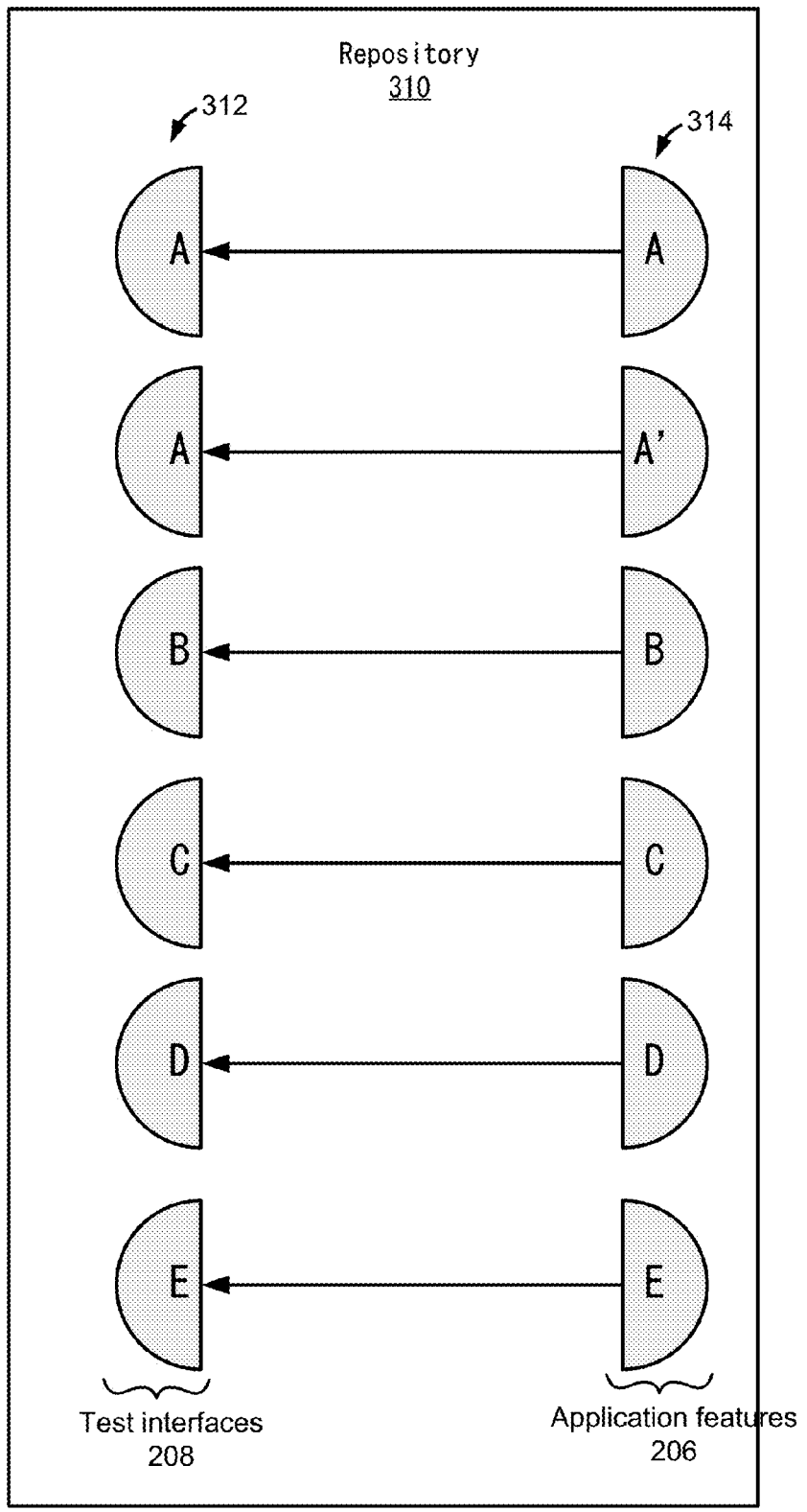
FIG. 3B depicts an example of a feature repository according to one embodiment.

FIG. 3B depicts an example of a feature repository 310 according to one embodiment. At 312, left semi-circles represent test interfaces features 208. As discussed above, the interfaces are what the features do. At 314, the right semi-circles represent application features 206, which may be the low-level details of the features or how the features work in application 106. As shown, application features A, A', B, C, D, and E and test interfaces A, B, C, D, and E are shown. Other features may also be appreciated.

As shown, feature A is connected to test interface A, feature B is connected to test interface of feature B, etc. The features are not connected to each other and thus changing one feature does not affect other features. It is noted that feature A' uses the same test interface A. This may be because some internal details of how feature A' works changed, but what feature A' does in general has not changed. Also, it is noted that a feature C' is not needed in repository 310. This is because feature C' was changed in FIG. 3A due to feature C's dependency on feature B, and feature B being changed to feature D. Because the features are disconnected, a feature C' is not needed to represent a new or changed dependency when the feature has the same internal details of how it works. However, a feature A' is included in repository 310 because some details of feature A were changed from version #1 to version #2.

In one embodiment, in a standard page object model, the features themselves track dependencies between features. In particular embodiments, the features have direct references removed between features. In this case, the features can be loosely coupled together differently by each application model. Removing the references to dependencies may require restructuring the code of application 106. Specifically, rather than the features knowing their dependencies, particular embodiments add in the concept of a blueprint that manages the dependencies. This has no impact on the tests themselves or how they are run. For example, the features may specify a dependency with a variable that is later inserted by the application blueprint. The repository 310 serves as a factory that can instantiate the specific feature implementations that respect the feature interfaces for that version of the application 106. One application model for each supported version of the application may be maintained, which pulls from a large pool of features and interfaces.

Figure 4:
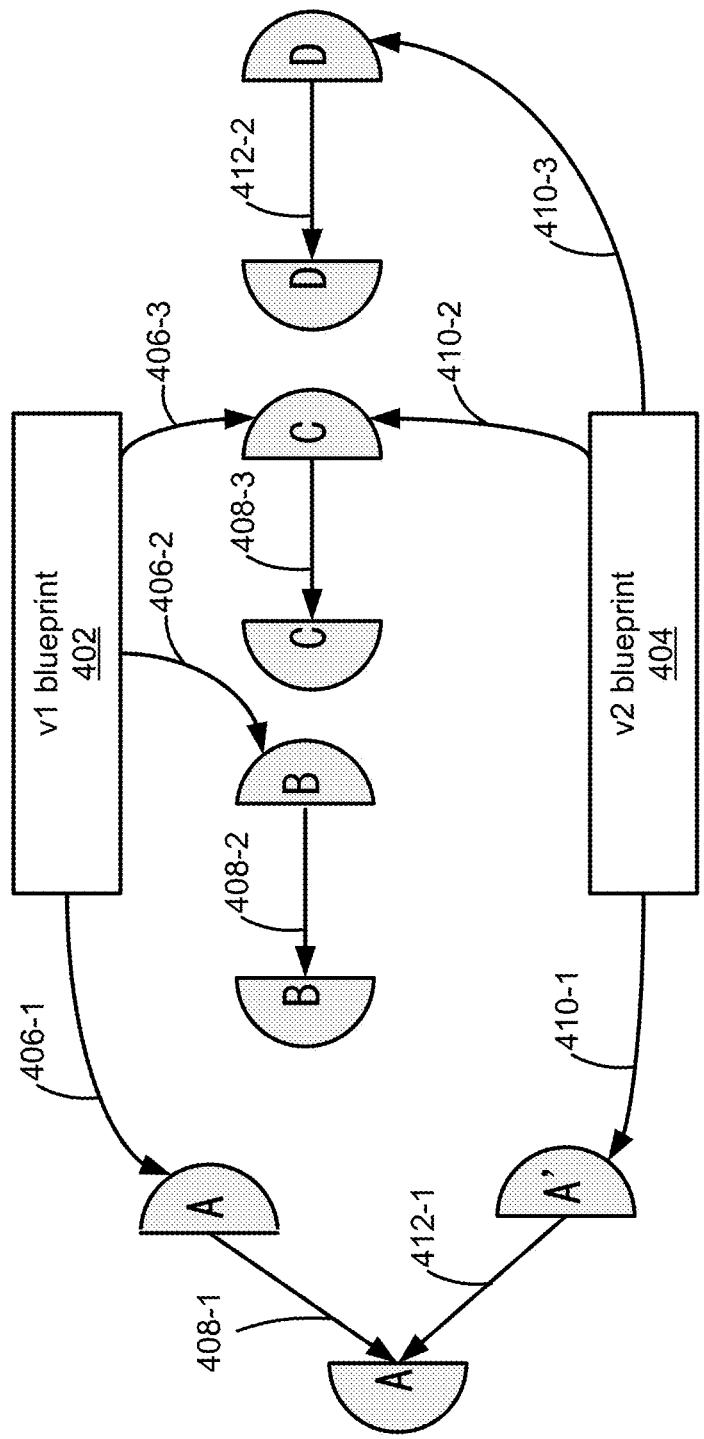
FIG. 4 depicts an example of using different application blueprints to build application models according to one embodiment.

To use repository 310, test system 102 uses an application version blueprint to build an application model 204 dynamically, such as at runtime when a test is to be executed. FIG. 4 depicts an example of using different application blueprints to build application models according to one embodiment. At 402, an application version #1 (v1) blueprint is shown and at 404, an application version #2 (v2) blueprint is shown. The blueprint organizes which features are included in an application version. This blueprint is used to build an application model.

The version #1 blueprint specifies application version #1 includes features A, B, and C at 406-1, 406-2, and 406-3. Further, feature A is connected to interface A at 408-1, feature B is connected to interface B at 408-2, and feature C is connected to interface C at 408-3.

At 410-1, 410-2, and 410-3, version #2 blueprint specifies application version #2 includes feature A', C, and D. Feature A' may use the same interface A and is connected to interface A at 412-1. Feature C is connected to interface C at 408-3, and feature D is connected to interface D at 412-2. The version #2 blueprint does not need to use a feature C' because feature C is not dependent on feature B or feature D in the application blueprint. The feature has a dependency, but the dependency does not specify exactly what feature satisfies the dependency. For example, either feature B or feature D can satisfy the dependency, but feature C does not care which feature is used to satisfy the dependency. The logic for handling the dynamic fulfilling of dependencies is in the application blueprint. When test system 102 builds the application model, test system 102 chooses which features to use to satisfy the dependencies of other features. The test is formulated the same whether or not dependencies are specified in the feature or not. A changed feature C' is not included even though feature B is replaced with feature D in application version #2 due to references for feature C to feature B being removed. Also, version #2 includes a feature A' that has some modified details in it from feature A, but does not need a new interface A. This may be because the changes to how feature A' works did not change what feature A' does, and thus feature A' does not require a new interface. Since dependencies are not used in the features and interfaces in repository 310, test system 102 can construct an application model from either blueprint version #1 or version #2 blueprint at any time and run all tests associated with the features of that blueprint.

Figure 5:
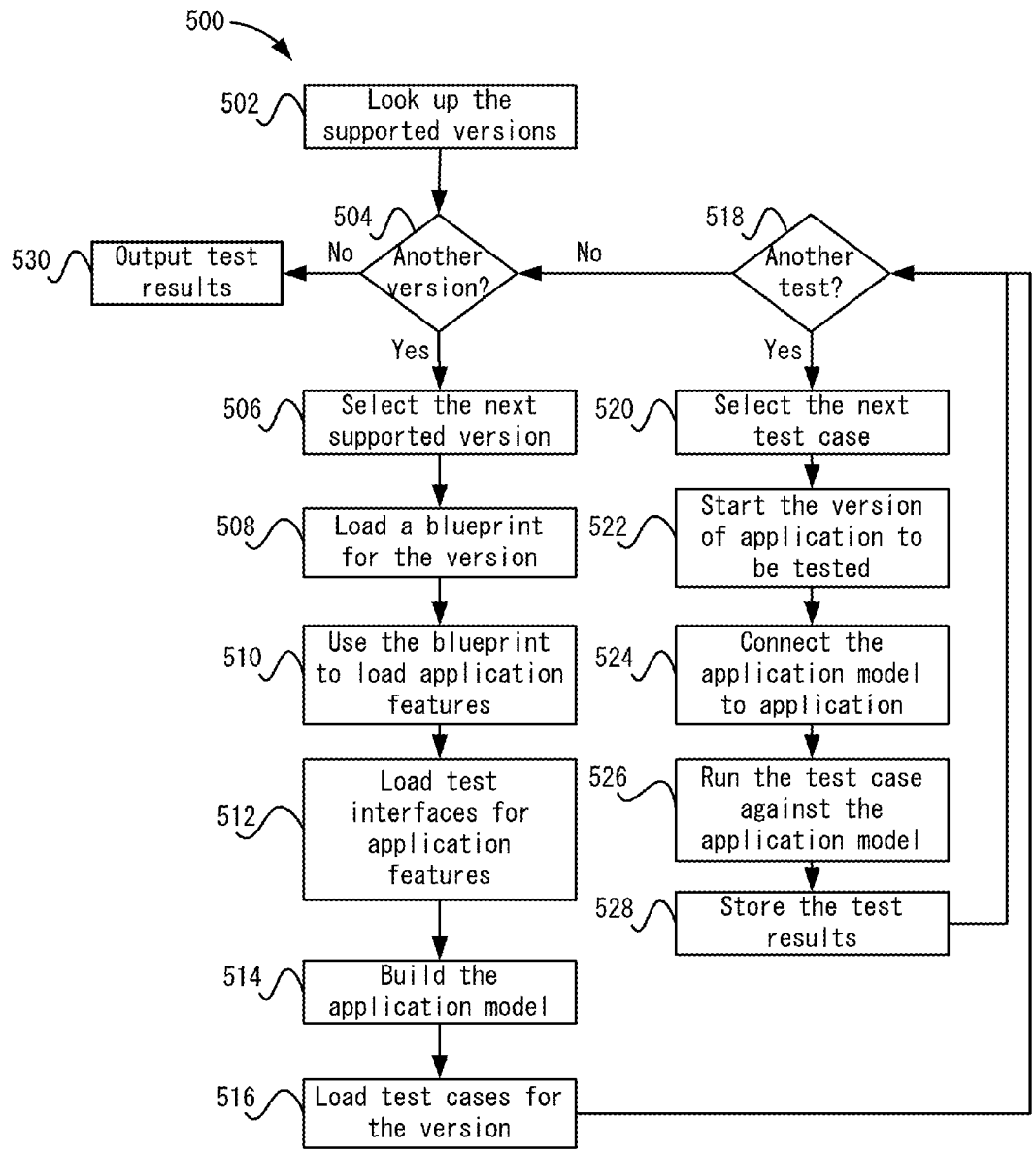
FIG. 5 depicts a simplified flowchart of method for performing a test according to one embodiment.

FIG. 5 depicts a simplified flowchart 500 of method for performing a test according to one embodiment. In one embodiment, the following steps may be performed dynamically after a request to perform a test is received. At 502, test system 102 looks up the supported versions. The supported versions of the application may include different versions that have been released and are being used on live hosts 108 in additional to new unreleased versions. For the testing, the supported versions for testing may be present on test hosts 104-1.

At 504, test system 102 determines if there is a version to test. In the beginning, the first version may be tested and thereafter, subsequent versions are tested. At 506, assuming there is a next version to test, test system 102 selects the next supported version. In one embodiment, all versions may be tested in sequence from the first version up to the current version/unreleased versions. In other embodiments, only a select number of versions may be tested.

At 508, test system 102 loads a blueprint for the version. In one embodiment, each version of the application may include a different blueprint. The blueprint may include a list of features for the version. [The blueprint also includes logic to manage dependencies and routing between features. Specifically, when a test interacts with a feature in a way that changes the application state, the blueprint knows which feature can handle the new state. In contrast, with a traditional page-object model when a test interacts with a feature to change application state the feature itself knows which feature will handle the new state.

At 510, test system 102 uses the blueprint to load application features 206. In this case, test system 102 loads code for the features and combines the code.

At 512, test system 102 loads test interfaces 208 for application features 206. The code for the test interfaces 208 may be loaded from repository 310 and combined.

At 514, test system 102 builds the application model. In this case, the application blueprint may be used to connect the features and interfaces together. As explained above, the features do depend on each other, but the features are flexible about what feature satisfies each dependency. The blueprint matches up a dependent feature and a suitable dependency feature when it generates the application model. The output is a program in which every dependency has been satisfied.

At 516, test system 102 loads test cases for the version. For example, the test cases may test one or more of versions of application 106.

At 518, test system 102 determines if there is another test case to run. If this is the first test case, at 520, test system 102 selects the next test case. This can be the first test case or the next test case for the version of application 106.

At 522, test system 102 starts the version of application 106 to be tested. For example, test system 102 may communicate with test host 104-1 that includes the version of the application 106.

At 524, test system 102 connects the application model to application 106. In one embodiment, the application and the application model are on different hosts, so 'connecting' is establishing a network connection between the applications running on each host. However, connecting the application model to application 106 may be any action such that the application and application model can communicate.

At 526, test system 102 runs the test case against the application model. For example, the test case may have certain conditions that are executed against the features. The test condition may be executed and the result of being executed against application 106 running on test host 104-1 is recorded. To run the test case against the application model, test system 102 determines the feature in the application model and then the interface of the feature. The interface of the feature is then used to generate the test condition for the feature in application 106. In one embodiment, when the tests are run, the tests issue commands to the application model, which in turn issues subordinate commands to the application itself. Each command that a test issues to the application model belongs to an interface, and the application model uses the corresponding feature to process that command and generate the appropriate subordinate command(s) to run against the application itself. The resulting application state is communicated back to the test by way of the application model, and the test decides whether that state represents a failure or if the test can continue. Reaching the end of the test with no failures (or a number of failures below a threshold) constitutes a success.

At 528, after the test case has been run, test system 102 stores the test results. The process then reiterates to 518 where test system 102 determines if there is another test case to run. If not, at 504, test system 102 determines if there is another version to test. If so, the process continues at 506 to select the next supported version. If not, at 530, test system 102 may publish the test results and the process ends.

Figure 6:
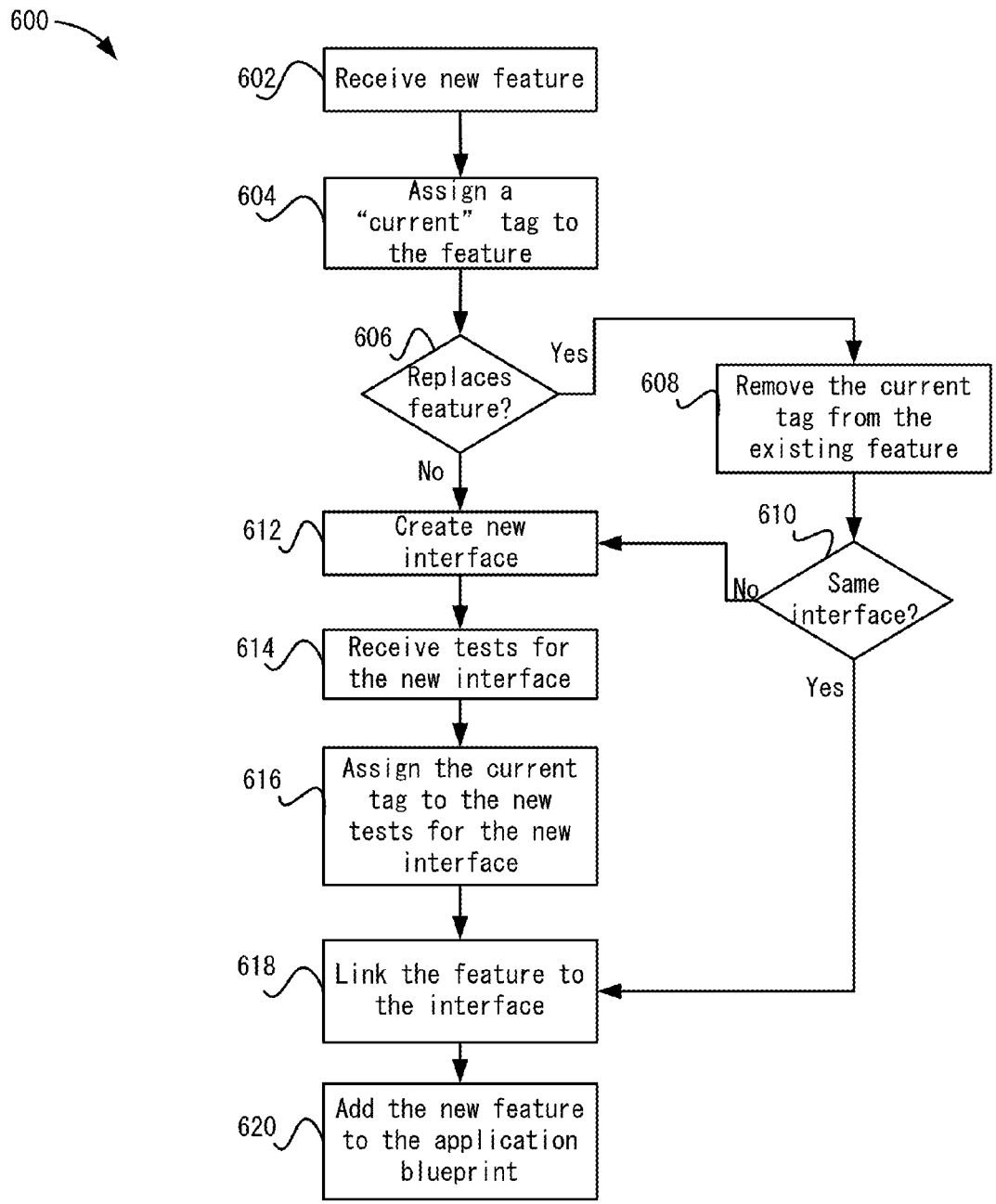
FIG. 6 depicts a simplified flowchart of a method for adding new features to a new application version according to one embodiment.

To allow for the testing of different versions, test system 102 provides a process for adding new features to a new application version such that an application blueprint for the new version can be automatically generated. FIG. 6 depicts a simplified flowchart 600 of a method for adding new features to a new application version according to one embodiment. At 602, a new feature that has been developed is received. For example, a developer may develop a new feature for a new version of application 106. At 604, test system 102 assigns a "current" tag to the feature. The current tag may indicate that this feature is associated with the most current version of application 106. At 606, test system 102 determines if the new feature replaces an existing feature. For example, an identifier can be used to determine if the new feature replaces an existing feature.

At 608, if the new feature replaces an existing feature, test system 102 removes the current tag from the existing feature. Also, test system 102 may remove the current tag from the test case that tests the existing feature. In this case, the test for the existing feature should not have the current tag because this feature is not current.

At 610, test system 102 determines if the new feature uses the same interface. in one embodiment, new features should re-use an existing interface whenever they can. If the new feature processes any different commands than the old feature, then most likely the new feature cannot use the old interface.

If the new feature does not use the same interface, at 612, a new interface is created. Also, referring back to 606, if the new feature did not replace an existing feature, then a new interface needs to be created. This is because this feature has not been used before and thus needs a new interface.

At 614, test system 102 receives tests for the new interface. The tests may test how the feature works in application 106. For example, test conditions may be included in the tests that can be executed with the version of the application.

At 616, test system 102 assigns the current tag to the new tests for the new interface. At 618, test system 102 links the feature to the interface. For example, a specification that links the feature to the interface may be received. At 620, test system 102 adds the new feature to the application blueprint. The above process continues as new features are added or existing features are changed for a new version.

After generating the blueprint for a new release of the version, then test system 102 may automatically change the version tags associated with the features. That is, when a version is released, that version may be assigned an identifier, such as version #5. Test system 102 may then change the tags associated with the features for the version that is newly released from current to the version identifier.

Figure 7:
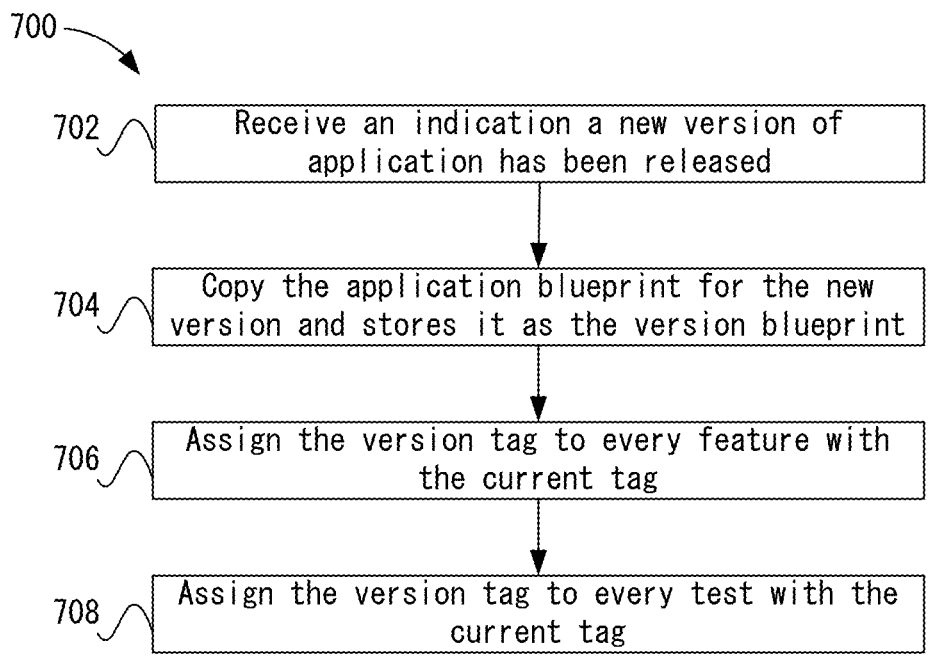
FIG. 7 depicts a simplified flowchart of a method for managing tags according to one embodiment.

The following describes the process of managing tags for the features. FIG. 7 depicts a simplified flowchart 700 of a method for managing tags according to one embodiment. At 702, test system 102 receives an indication a new version of application 106 has been released. For example, the new version of application 106 may be released to general availability.

At 704, test system 102 copies the application blueprint for the new version and stores it as the version blueprint. For example, test system 102 may assign the release identifier for the version to the application blueprint.

At 706, test system 102 assigns the version tag to every feature with the current tag. For example, every feature that is found in the new version of application 106 should include the current tag. This current tag is then changed to the version tag, which may correspond to the version identifier for the new version.

At 708, test system 102 assigns the version tag to every test with the current tag. This assigns the same version tag for all the tests for the new version of application 106.

Figure 8:
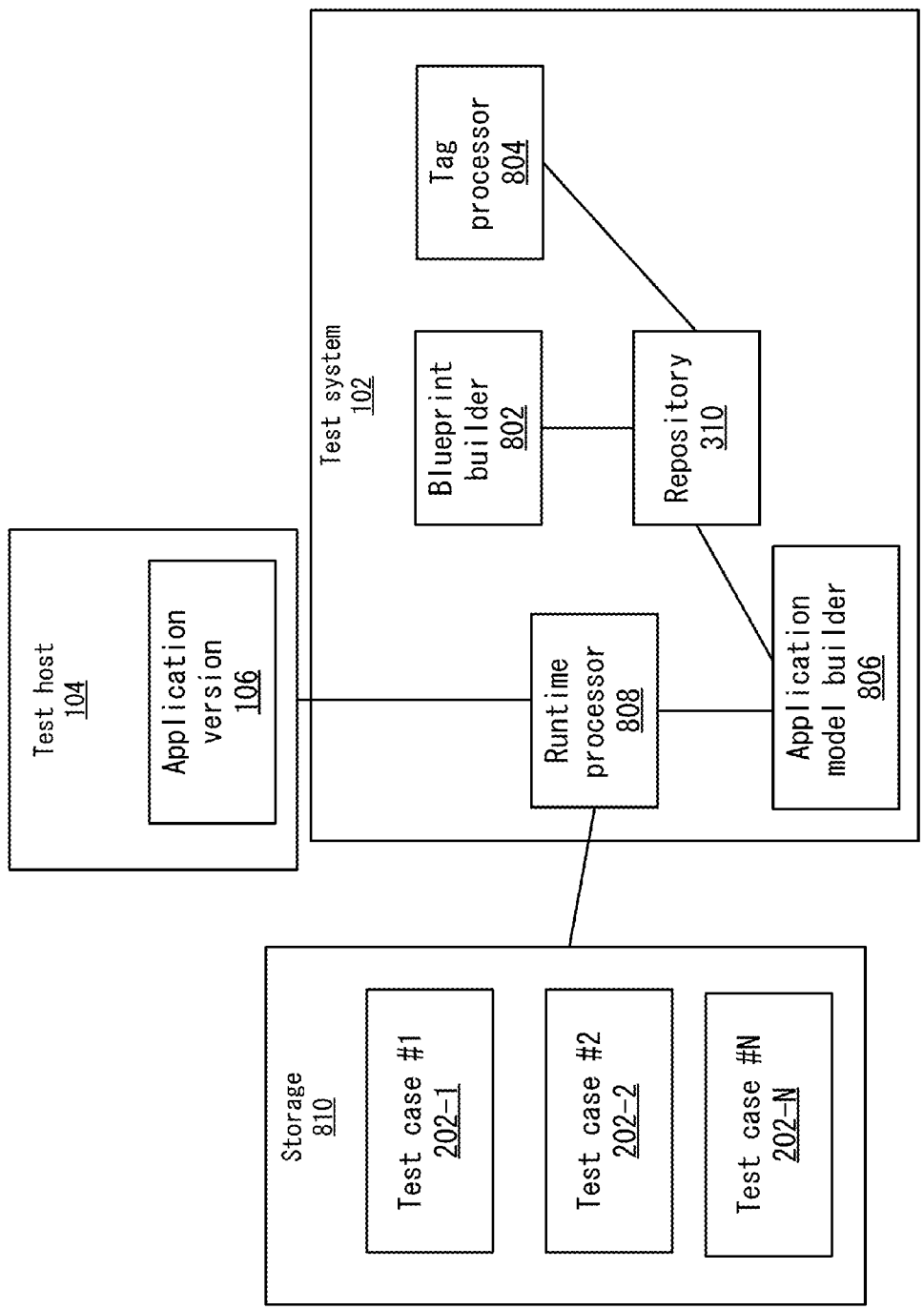
FIG. 8 depicts a more detailed example of a test system according to one embodiment.

FIG. 8 depicts a more detailed example of test system 102 according to one embodiment. A blueprint builder 802 builds a blueprint for a version of application 106 as features are added or changed from a previous version. Also, tag processor 804 manages the tags for the versions of application 106. For example, tag processor 804 manages which features have the current tag and then changes the version tag to be the version identifier when a version is released.

Also, application model builder 806 can build an application model using a blueprint. For example, application model builder 806 may build the application model using feature interfaces from repository 310.

Once the application model is built, runtime processor 808 may perform the tests using test cases from storage 810 on application 106 and application version 106 from test host 104.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments.

The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
  receiving, by a computing device, a plurality of application blueprints for a plurality of versions of an application, wherein each application blueprint for each version of the application includes at least one different feature;
  selecting, by the computing device, one of the versions of the application for testing;
  loading, by the computing device, the application blueprint for the first version of the application, the application blueprint defining a first set of features supported by the first version of the application;
  loading, by the computing device, the first set of features and a first set of interfaces for the features, wherein interfaces in the first set of interfaces describe what a corresponding feature does;
  building, by the computing device, the application model by connecting the first set of interfaces to the first set of features at runtime when a test is to be executed,
  wherein features in the first set of features loosely define dependencies without pre-defining which feature satisfies the dependency, and wherein, at runtime, the application blueprint inserts which feature satisfies the dependency for features in the first set of features to dynamically generate the dependencies;
  connecting, by the computing device, the application model to the version of the application and a test case for the version of the application; and
  testing, by the computing device, the version of the application by executing a test case against the application model, wherein the first set of interfaces are used to test the first set of features of the version of the application.

2. The method of claim 1, further comprising:
  storing a plurality of features found in the plurality of blueprints in a repository, wherein the first set of features are loaded from the repository; and
  storing a plurality of interfaces found in the plurality of blueprints in the repository, wherein the first set of interfaces are loaded from the repository.

3. The method of claim 2, wherein the plurality of features do not reference each other in code that is stored in the repository.

4. The method of claim 3, wherein the application model inserts the dependencies for features in the plurality of features.

5. The method of claim 1, wherein the plurality of features in the repository are tagged with an associated version tag that indicates which version or versions each feature is included in.

6. The method of claim 1, wherein different application blueprints include a different set of features.

7. The method of claim 1, wherein loading the first set of features and the first set of interfaces for the features comprises:
  adding the first set of features and the first set of interfaces for the features to the application model.

8. The method of claim 1, further comprising:
  receiving a new feature; and
  assigning a current tag to the new feature.

9. The method of claim 8, further comprising:
  when the new feature replaces an existing feature, removing the current tag from the existing feature.

10. The method of claim 9, further comprising:
  when the new feature uses a new interface or does not replace the existing feature, generating the new interface for the new feature.

11. The method of claim 10, further comprising:
  adding the new feature to an application blueprint for a new version of the application.

12. A non-transitory computer-readable storage medium containing instructions, that when executed, control a computer system to be configured for:
  receiving a plurality of application blueprints for a plurality of versions of an application, wherein each application blueprint for each version of the application includes at least one different feature;
  selecting one of the versions of the application for testing;
  loading the application blueprint for the first version of the application, the application blueprint defining a first set of features supported by the first version of the application;
  loading the first set of features and a first set of interfaces for the features, wherein interfaces in the first set of interfaces describe what a corresponding feature does;
  building the application model by connecting the first set of interfaces to the first set of features at runtime when a test is to be executed;
  wherein features in the first set of features loosely define dependencies without pre-defining which feature satisfies the dependency, and wherein, at runtime, the application blueprint inserts which feature satisfies the dependency for features in the first set of features to dynamically generate the dependencies;
  connecting the application model to the version of the application and a test case for the version of the application; and
  testing the version of the application by executing a test case against the application model, wherein the first set of interfaces are used to test the first set of features of the version of the application.

13. The non-transitory computer-readable storage medium of claim 12, further configured for:
  storing a plurality of features found in the plurality of blueprints in a repository, wherein the first set of features are loaded from the repository; and
  storing a plurality of interfaces found in the plurality of blueprints in the repository, wherein the first set of interfaces are loaded from the repository.

14. The non-transitory computer-readable storage medium of claim 13, wherein the plurality of features do not reference each other in code that is stored in the repository.

15. The non-transitory computer-readable storage medium of claim 14, wherein the application model inserts dependencies for features in the plurality of features.

16. The non-transitory computer-readable storage medium of claim 12, wherein the plurality of features in the repository are tagged with an associated version tag that indicates which version or versions each feature is included in.

17. The non-transitory computer-readable storage medium of claim 12, further comprising:
receiving a new feature;
assigning a current tag to the new feature;
when the new feature replaces an existing feature, removing the current tag from the existing feature;
when the new feature uses a new interface or does not replace the existing feature, generating the new interface for the new feature; and
adding the new feature to an application blueprint for a new version of the application.

18. An apparatus comprising:
one or more computer processors; and
a non-transitory computer-readable storage medium comprising instructions, that when executed, control the one or more computer processors to be configured for:
receiving a plurality of application blueprints for a plurality of versions of an application, wherein each application blueprint for each version of the application includes at least one different feature;
selecting one of the versions of the application for testing;
loading the application blueprint for the first version of the application, the application blueprint defining a first set of features supported by the first version of the application;
loading the first set of features and a first set of interfaces for the features, wherein interfaces in the first set of interfaces describe what a corresponding feature does;
building the application model by connecting the first set of interfaces to the first set of features at runtime when a test is to be executed;
wherein features in the first set of features loosely define dependencies without pre-defining which feature satisfies the dependency, and wherein, at runtime, the application blueprint inserts which feature satisfies the dependency for features in the first set of features to dynamically generate the dependencies;
connecting the application model to the version of the application and a test case for the version of the application; and
testing the version of the application by executing a test case against the application model, wherein the first set of interfaces are used to test the first set of features of the version of the application.

\* \* \* \* \*